COUPLING OF BISTABLE ELEMENTS BY CONDUCTIVITY MODULATION

Original Filed May 14, 1969

INVENTOR.
WOLFDIETRICH KASPERKOVITZ
BY
Frank R. Trifari
AGENT

COUPLING OF BISTABLE ELEMENTS BY CONDUCTIVITY MODULATION

Original Filed May 14, 1969 2 Sheets-Sheet 2

INVENTOR.
WOLFDIETRICH KASPERKOVITZ
BY
[signature]
AGENT

United States Patent Office 3,717,775

Patented Feb. 20, 1973

3,717,775

COUPLING OF BISTABLE ELEMENTS BY CONDUCTIVITY MODULATION

Wolfdietrich Kasperkovitz, Emmasingel, Eindhoven, Netherlands, assignor to U.S. Philips Corporation, New York, N.Y.

Continuation of abandoned application Ser. No. 824,502, May 14, 1969. This application May 6, 1971, Ser. No. 141,022

Claims priority, application Netherlands, May 17, 1968, 6806967

Int. Cl. H01l 19/00

U.S. Cl. 307—221 B 4 Claims

ABSTRACT OF THE DISCLOSURE

A semiconductor shift register, memory or ring counter is described using bistable elements, such as thyristors or unijunction transistors, coupled by means of conductivity modulation devices, such as a unijunction type of transistor, with the coupling such that the current which causes conductivity modulation of the coupling device drains off accumulated minority carriers in a turned-ON preceding bistable element. Advantages include faster speed and simpler construction.

Figure 1:
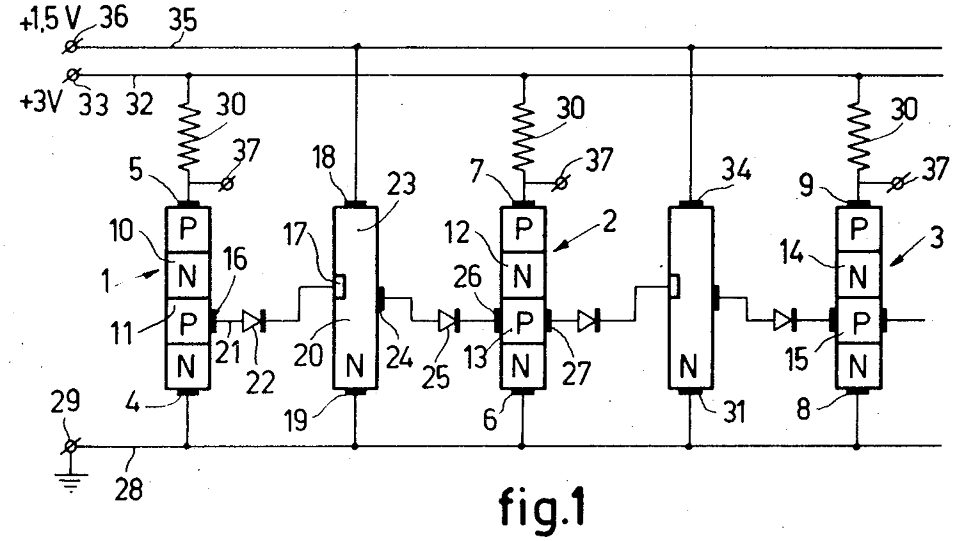

This is a continuation of Ser. No. 824,502, filed May 14, 1969, now abandoned.

The invention relates to a semiconductor device or circuit having at least two bistable semiconductor elements which are coupled together electrically and which contain each a semiconductor accumulation region, in which in one of the stable conditions, the fired or ON condition, accumulation of minority charge carriers occurs.

Bistable circuit elements of the said type are formed, for example, by pnpn-structures and unijunction transistors. Such an element in itself may also be formed by a circuit, for example, a flip-flop circuit, of which each time one transistor is bottomed. These elements may be coupled together electrically so that, for example, memory circuits, shift registers, ring counters, and so on, can be constructed which are frequently used particularly in computer technology. The coupling together generally takes place by means of resistors, capacitors and/or other passive or active circuit elements. See, for example, Shockley and Gibbons, Semiconductor Products, 1958, vol. 1, No. 1, pp. 9–13.

A drawback of the use of the circuit elements in question in the said circuits is that said elements are comparatively slow, particularly with relation to the transition from the fired to the extinguished or OFF condition, as a result of the comparatively long time which is necessary for eliminating the accumulated concentration of charge carriers. Furthermore these circuits are usually complex, therefore occupy rather much space, and often have a comparatively high dissipation.

It is the object of the invention to provide a semiconductor device in which two or more of the said bistable elements are coupled in such manner that the said drawbacks are avoided or are at least mitigated considerably.

The invention is based on the recognition of the fact that by using a coupling in which conductivity modulation is used by injected minority charge carriers in a semiconductor region for adjusting or controlling the potential of a control electrode provided on a bistable element, a comparatively rapid memory or counting circuit can be constructed in a simple manner from simple circuit elements which in normal circumstances are often slow, while such a circuit arrangement can also be integrated very efficaciously and, compared with known circuits, has a low dissipation.

A semiconductor device of the type mentioned in the preamble is therefore characterized in that according to the invention, the bistable elements are coupled by a first output contact which is connected to the accumulation region of the first bistable element, which first contact is electrically connected to a second input contact which is provided on a further semiconductor region provided with a first and a second connection contact and which second input contact is adapted to inject charge carriers therein, whereby a current can flow in the connection between the first and the second contact so that minority charge carriers are removed from the accumulation region of the first bistable element and minority charge carriers are injected in the further semiconductor region so that conductivity modulation can be produced in a modulation region extending from the second contact to the first connection contact. A third contact is furthermore provided on said further semiconductor region on or in the proximity of the modulation region, and said third contact being connected electrically to a fourth contact which is arranged on an accumulation region of a second bistable element.

In particular circumstances one or more of the said contacts can be formed by contacts which are normally present already on the individual bistable elements, for example, control electrodes.

Conductivity modulation in the meaning of the invention is to be deemed to be present here and hereinafter at a given point in the semiconductor body, when at said point the concentration of the injected minority charge carriers is at least of the same order of magnitude as the equilibrium concentration of the majority charge carriers present at that area as a result of impurity doping.

In addition to a low dissipation, comparatively high switching speeds can be obtained with the device according to the invention as compared with known devices which are constructed from the same circuit elements. This is caused inter alia by the fact that by the same current pulse, minority charge carriers can be removed from the accumulation region of the first bistable element and minority charge carriers can be injected in the accumulation region of the second bistable element. For that purpose, the semiconductor device according to the invention is advantageously used in a circuit arrangement in which such a potential difference is temporarily provided, in the form of a shift pulse, between the first and the second connection contact that, if the first bistable element is in the fired condition a current is produced in the connection between the first and the second contact so that minority charge carriers are removed from the accumulation region of the first bistable element and minority charge carriers are injected in the said further semiconductor region, so that conductivity modulation occurs in the said modulation region as a result of which the third contact, after restoring of the original voltage condition of the connection contacts, obtains such a potential that the second bistable element arrives in the fired condition.

According to the invention, the coupling of the bistable elements is based on the variation of the resistance of the modulation region as a result of conductivity modulation and the resulting potential variation of the third and the fourth contact. For producing such a resistance variation it can in circumstances be sufficient that conductivity modulation occurs only in a comparatively small part of the modulation region. Preferably, however, according to the invention, the device is proportioned so that conductivity modulation can be produced in the modulation region over a region which extends at least from the third contact to the first connection contact, so that the potential variation of the third contact, as a result of the voltage pulse on the two said connection contacts for igniting the second bistable element, becomes maximum.

The second contact which can inject minority charge carriers in the said further semiconductor region, may be constituted, for example, by a metal semiconductor contact, for example, a point contact. However, according to the invention, the second contact is preferably constituted by a surface region of a conductivity type opposite to that of the said further semiconductor region, which surface region constitutes a pn-junction with the further semiconductor region, which often has advantages in connection with the technology to be used and the reproducibility.

The first contact which is destined for removing minority charge carriers from the accumulation region of the first bistable element may be an ohmic contact, for example, the control electrode of a thyristor. As is known, many thyristors can be extinguished by a suitably chosen current pulse on the control electrode, in which the high concentration of minority charge carriers accumulated in the two base regions in the fired condition dissappears. In other cases, for example, when using unijunction transistors as bistable elements, the first contact is advantageously constructed in the form of a rectifying contact which is capable of collecting minority charge carriers from the accumulation region. This contact may be a metal semiconductor contact, for example, a point contact. Due to the higher collector efficiency, however, the first contact is preferably constructed in the form of a pn-junction. A particularly high collector efficiency can be obtained by constructing the first contact in the form of a hook collector. The return of minority charge carriers to the accumulation region of the first bistable element and the associated danger of re-firing of said element is strongly reduced as a result. In this case also an intensified injection stream at the second contact occurs by multiplication of the collected minority charge carriers. At the same time a better drain of minority charge carriers is obtained by the electric field which is coupled to the stream of majority charge carriers in the accumulation region which occurs as a result of the drain of minority charge carriers.

The return of minority charge carriers to the accumulation region of the first stable element and the collection of minority charge carriers from the modulation region by the second contact after termination of the shift pulse as a result of which undesired re-firing of the first bistable element could occur, may in circumstances also be prevented advantageously by making the surface area of the first contact larger than that of the second contact. As a result of this the current density in the first contact is considerably smaller than in the second contact, so that the first contact obtains poor emitter properties with respect to the second contact, while the collector properties of the second contact also deteriorate with respect to those of the first contact. As a result of this the possibility of return of minority charge carriers from the modulation region and into the accumulation region of the first bistable element after termination of the shift pulse, as a result of which undesired spontaneous firing of the first bistable element occurs, is prevented.

The fourth contact which is destined for firing the second bistable element may be an ohmic contact, for example, the control electrode of a thyristor. In circumstances, however, the fourth contact is advantageously constructed in the form of a rectifying contact which can inject minority charge carriers into the accumulation region of the second bistable element. This contact may be formed by a metal semiconductor contact, for example, a point contact. According to a preferred embodiment of the invention, however, the fourth contact constitutes a pn-punction with the accumulation region of the second bistable element.

According to the invention, the return of minority charge carriers to the accumulation region of the first bistable element with the danger of undesired spontaneous firing thereof can be prevented to an even stronger extent by incorporating a diode in the connection between the first and the second contact, by which diode a current is passed which occurs upon injection of minority charge carriers by the second contact in the modulation region. According to the invention, in order to avoid return of minority charge carriers from the accumulation region of the second bistable element, and hence undesired extinguishing thereof, a diode can advantageously be incorporated also in the connection between the third and the fourth contact, which diode is connected so as to pass only a current in the direction of the firing current.

The invention may advantageously be used in coupling bistable circuit elements of varying natures, in as far as they show as a common characteristic an accumulation region in which accumulation of minority charge carriers occurs in one of the two bistable conditions. The invention is of particular importance in a preferred embodiment in which at least one of the bistable elements is constituted by a pnpn-structure or a unijunction transistor. These are bistable elements with which memories, shift registers, ring counters, and so on, can efficaciously and very simply be constructed while using the invention. According to the invention, the bistable elements are advantageously chosen to be the same although in circumstances also circuit arrangements with bistable elements of varying natures and/or structures may be used.

If the semiconductor device comprises exclusively unijunction transistors as bistable elements, the device is constructed so that the base region of the diodes is of the same conductivity type as the said further semiconductor region. According to a preferred embodiment, the base contact of each unijunction transistor is connected to a first supply line which is also connected to the said first connection contact, while the other base contact is connected to a second supply line which is connected to the second connection contact. In this manner a shift register is obtained which can be operated by applying a bias voltage between the two supply lines, which bias changes sign temporarily during a shift pulse.

In the case of too large a pulse voltage or too long a lifetime of the minority charge carriers, the danger may occur that during the shift pulse the minority charge carriers which are not drained by the first contact are injected by the emitter of the first unijunction transistor in the direction of the said first supply line, which after termination of the shift pulse, may cause spontaneous firing of said unijunction transistor. An important preferred embodiment in which the first bistable element is constituted by a unijunction transistor whose accumulation region lies between the emitter contact and a base contact is therefore characterized according to the invention in that the emitter contact is electrically connected to the other base contact through a diode in which, proceeding from said other base contact, via the diode and the emitter contact to the underlying semiconductor region, the diode and the emitter contact are connected in opposite senses. As a result of this, injection of the emitter contact via the underlying semiconductor body to the other base contact and hence the danger of spontaneous firing is avoided since the current path via the diode has a considerably smaller series resistance than the current path via the semiconductor body.

Such a diode can advantageously be integrated in the semiconductor body of the unijunction transistor by providing in the surface region which constitutes the emitter contact a surface region of the opposite conductivity type which consitutes a pn-junction with the emitter region and is conductively connected to the said other base contact.

The semiconductor device according to the invention is of particular importance in integrated circuits in which the bistable elements and the further semiconductor regions form part of the same semiconductor body. According to an important preferred embodiment all the contacts are provided on the same, preferably flat, surface of the semiconductor body, which surface is at least partly coated with an electrically insulating layer, the contacts adjoining the semiconductor body via apertures in said insulating layer and being connected to conductors which are situated at least partly on the insulating layer.

A further important preferred embodiment of the invention is characterized in that the second contact is surrounded over a considerable part of its circumference by the third contact and the first connection contact. As a result of this the modulation region is kept as small as possible and the injected minority charge carriers can substantially not escape by diffusion from the modulation region so that a good effect of the coupling is stimulated.

Figure 2:
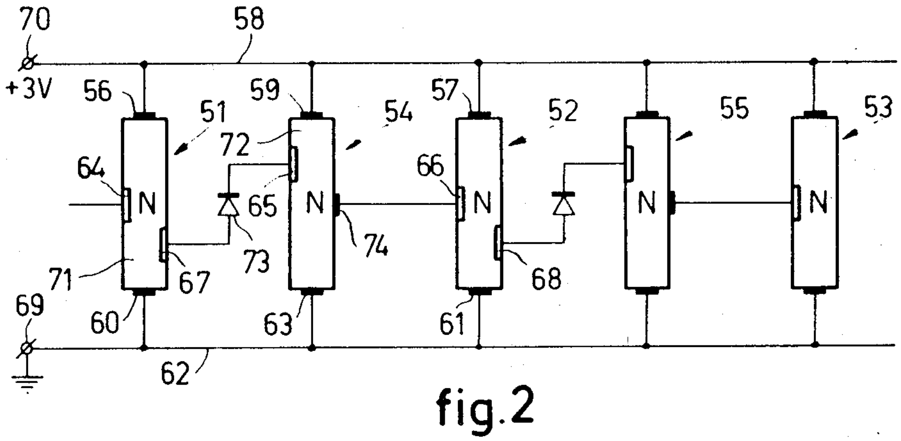
Figure 3:
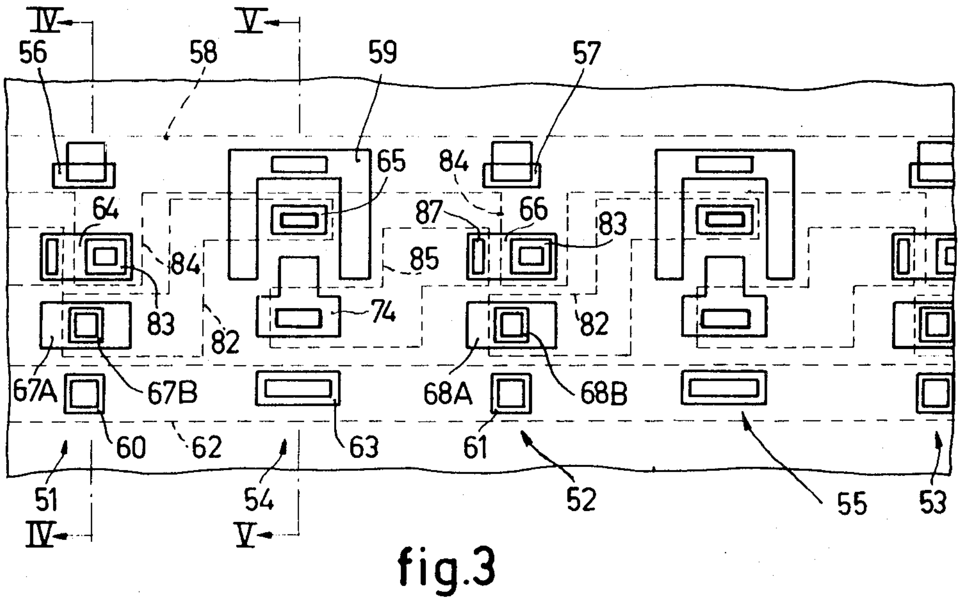
Figure 4:
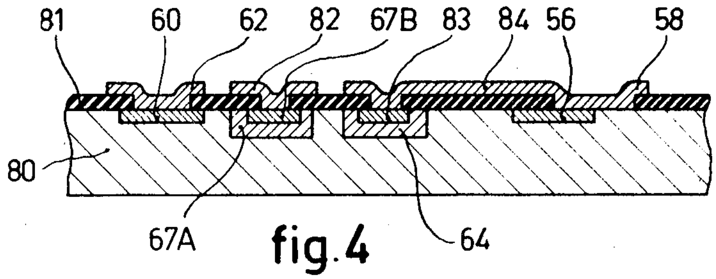
Figure 5:
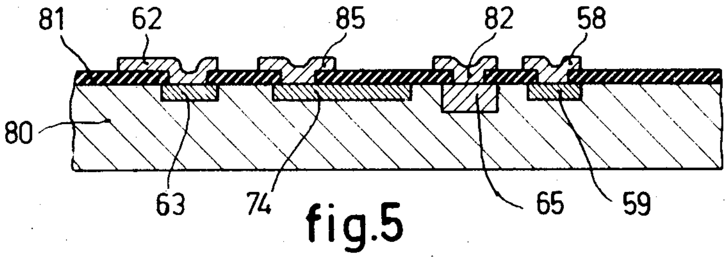

In order that the invention may be readily carried into effect, a few examples thereof will now be described in greater detail with reference to the accompanying drawings, in which FIG. 1 diagrammatically shows a semiconductor device according to the invention, FIG. 2 diagrammatically shows another semiconductor device according to the invention, FIG. 3 is a diagrammatic plan view of a semiconductor device according to the invention in an integrated form, FIG. 4 is a diagrammatic cross-sectional view of the device shown in FIG. 3 taken on the line IV—IV and FIG. 5 is a diagrammatic cross-sectional view of the device shown in FIG. 3, taken on the line V—V.

The dimensions of the figures are not to scale and particularly in the cross-sectional views the dimensions in the direction of the thickness are strongly exaggerated for clarity.

FIG. 1 diagrammatically shows a part of a semiconductor device having a number of bistable semiconductor circuit elements which are alike and are coupled together electrically and are in the form of pnpn-silicon thyristors 1, 2 and 3 which are each provided with two end contacts (4, 5), (6, 7), (8, 9). Each of these bistable elements comprises an accumulation region, in this case the base regions (10, 11), (12, 13) and (14, 15) in which during the readily conducting (fired) or ON condition of the element accumulation of minority charge carriers occurs.

According to the invention, the bistable elements 1 and 2 are coupled by a first contact 16, for example, the control electrode of the thyristor 1, which is connected to the p-type accumulation region 11 and forms an ohmic contact therewith and is electrically connected to a second contact 17 which is provided in the form of a diffused p-type surface region on a further semiconductor region 20 in the form of a rod-shaped n-type silicon body provided with a first connection contact 18 and a second connection contact 19. The second contact 17 forms a p-n junction with the semiconductor region 20 and can therefore inject holes in said region.

An electric current can flow in the connection 21 between the contacts 17 and 16 via a diode 22, conventionally from the contact 16 to the contact 17. As a result of this the element 1 can be extinguished or turned OFF in which the high concentration of electrons which is present in the accumulation region 11 in the fired condition disappears and hence electrons are removed from said region. As a result of this current, holes are also injected in the n-type region 20. As a result of this and when the current is sufficiently strong and the potential of the first connection contact 18 is sufficiently lower than that of the second connection contact 19, conductivity modulation can be produced in the modulation region 23 extending from the contact 17 to the contact 18. In the present example the region 20 with the contacts 17, 18 and 19 constitutes a unijunction transistor.

A third contact 24 is furthermore provided on the semiconductor region 24, near the modulation region 23, which contact is electrically connected, via a diode 25, to a fourth contact 26 which is provided on the accumulation region 13 of the second bistable element 2. This contact 26 may be, for example, the control electrode of the thyristor 2. Furthermore a contact 27 is provided on the accumulation region 13, by means of which contacts minority charge carriers can be removed from the accumulation region through a system analogous to the above described system, which couples the elements 2 and 3 together.

The contacts 4, 6, 8, 19 and 31 are connected to a supply line 28 which is connected to a reference potential, for example, earth, or ground via the connection terminal 29. The contacts 5, 7, and 9 are connected via load resistors 30 having a value of 1 kilohm, to a supply line 32 which is connected to a voltage source via a connection terminal 33 so that the line 32 obtains a potential of +3 volts.

The contacts 18 and 34 are connected to a supply line 35 which is connected to a voltage source via the connection terminal 36, so that the line 35 obtains a potential of +1.5 volts.

The operation of the device is as follows: the initial condition is with the thyristor 1 in the conductive or ON condition, so fired. In the potential of the first connection contact 18 a temporary variation is provided in that the voltage at the terminal 36 is reduced to −1.5 v. during a shift pulse of 500 nanosec. As a result of this the contact 17 is biased in the forward direction and holes are injected in the modulation region 23 and a current is produced in the connection 21. As a result of the occurrence of this control current the thyristor 1 is extinguished, the electrons accumulated in the region 11 disappearing. The stream of holes injected by the second contact 17 causes conductivity modulation substantially throughout the region between the contacts 17 and 18.

After restoring the original voltage of +1.5 volts on the line 35, the contact 24 has obtained a higher positive potential as a result of the said conductivity modulation than before the voltage pulse. As a result of this, a current occurs from contact 24 to contact 26 via the diode 25. Due to this latter current the thyristor 2, if it was initially in the non-conducting, extinguished condition, is fired while if the thyristor 2 initially was already fired, said condition is maintained. At the end of the shift pulse the thyristor 1 hence is extinguished and the thyristor 2 is fired.

If before the shift pulse the thyristor 1 was extinguished no injection occurs in the modulation region 23 during the shift pulse. As a result of this, if the thyristor 2 was extinguished before the shift pulse, no change in the condition will have occurred after the shift pulse. If, however, the thyristor 2 was fired before the shift pulse, the thyristor 2 will be extinguished during the shift pulse via the control current on the contact 27 from the following unijunction transistor.

The device shown in FIG. 1 constitutes a shift register in which the fired or non-fired condition of each of the pnpn-elements can be established, for example, by measuring the voltage drop across each of the elements between the terminals 37 and 29 (earth).

Contact 24 is provided so near to contact 17 that conductivity modulation can be produced substantially throughout the region of the modulation region 23 between the contact 24 and the contact 18.

The diode 22 prevents a reversal of the control current through the connection 21 and hence the re-firing of the thyristor 1. The diode 25 prevents the reversal of the direction of current in the connection between the contacts 24 and 26 so that an undesired extinguishing of the thyristor 2 is prevented and only a current in the direction of the firing curent is passed.

FIG. 2 shows another semiconductor device according to the invention. This device is constructed exclusively from bistable elements in the form of unijunction transistor 51, 52 and 53, while as in the preceding example, unijunction transistors (54, 55) are also used a coupling members.

All the unijunction transistors consist of a base region of n-type silicon on which two base contacts and an emitter contacts are provided. Each time one of said base contacts (56, 57) is connected to a first supply line 58, to which the base contact 59 of the unijunction transistor 54 is also connected, while the base contacts 60 and 61 are connected to a second supply line 62 which is also connected to the base contact 63 of the unijunction transistor 54 serving as a coupling member.

The emitter contacts 64, 65 and 66 are constructed in the form of p-type surface regions as well as the contacts 67 and 68.

The supply line 62 is connected, via terminal 69, to a fixed reference potential, for example, earth. The supply line 58 is brought at a potential of +3 volt via terminal 70. If initially the unijunction transistor 51 is fired, holes are injected in the base region by the emitter contact 64. Under the influence of the electric potential difference between the contacts 56 and 60 these holes move from the emitter contact 64 to the base contact 60 and produce in the accumulation region 71 situated between said contacts the occurrence of an increased concentration of holes.

When the potential of the terminal 70 during a pulse is reduced to —5 volt, the emitter contact 65 is connected in the forward direction so that, as a result of injection of holes, conductivity modulation occurs in the modulation region 72 situated between the contacts 65 and 59. A current flows from the contact 67 to the contact 65 via a diode 73, holes being collected by the contact 67 from the accumulation region 71. As a result of this the unijunction transistor 51 is extinguished.

On the base region of the unijunction transistor 54 is provided a contact 74 which is connected to the emitter contact 66 of the unijunction transistor 52. After termination of the pulse, the contact 74 obtains substantially the potential of the supply line 58 as a result of the conductivity modulation in the region 72, as a result of which the emitter contact 66 is connected in the forward direction and the unijunction transistor 52 is ignited so that after termination of the shift pulse the element 51 is extinguished and the element 52 is fired. The device constitutes a shift register analogous to that of the preceding example.

FIG. 3 shows a diagrammatic plan view of a part of a semiconductor device according to the invention in which the bistable elements and the further semiconductor region serving for coupling form part of the same semiconductor body with the accumulation regions and modulation regions. The device constitutes a shift register analogous to that shown in FIG. 2, in which discrete components were used. Therefore, corresponding components are referred to by the same reference numerals in FIGS. 2 and 3. FIGS. 4 and 5 diagrammatically show cross-sectional views taken on the line IV—IV and V—V of FIG. 3.

The device shown in FIGS. 3 to 5 is constructed from an n-type silicon body 80 (see FIGS. 4 and 5) having a resistivity of 0.3 ohm cm. which is covered with a layer 81 of silicon oxide. A number of surface regions of different conductivity types are diffused in said body, while using methods normally used in semiconductor technology, which surface regions form unijunction transistors and coupling members with planar structure. For example, the unijunction transistor 51 shown in the cross-sectional view of FIG. 4 (see also FIG. 3) consists of two base contacts which are formed by strongly doped n-type regions 56, 60, between which base contacts, a p-type emitter contact is provided in the form of the diffused region 64. Through windows in the oxide layer 81, the base contacts are connected to the supply lines 58 and 62 which are formed by strip-shaped metal layers which in the plan view shown in FIG. 3 are shown in broken lines. Like in the example shown in FIG. 2, the metal layer 62 is connected to earth, while the layer 58 is maintained at a potential of +3 volt.

The unijunction transistors 52 and 53 are constructed analogously, see FIG. 3.

The contacts which correspond to the contacts 67 and 68 shown in FIG. 2 are built up in this example from p-type regions 67A and 68A, respectively, and n-type regions 67B and 68B, respectively, provided therein. The structures (67A, 67B) and (68A, 68B) constitute hook collectors on the underlying accumulation regions of the unijunction transistors 51 and 52.

The coupling between the unijunction transistors 51 and 52 is effected entirely in accordance with FIG. 2 by means of the contacts 67 (A, B) 65, 74 and 66. The unijunction transistor 54 serving as the coupling member is integrated in the same semiconductor body as the elements 51 and 52. This unijunction transistor is shown in a cross-sectional view in FIG. 5 taken on the line V—V of FIG. 3. The region 67B of the hook collector 67 (A, B) is connected to the p-type emitter region 65, via the metal layer 82 on the oxide layer, while the contact 74 which is constituted by a diffused surface region (see FIG. 5) is connected to the metal layer 85 which adjoins the emitter contact 66 of the unijunction transistor 52 via the contact window 87.

The operation of the device shown in FIGS. 3 to 5 is entirely analogous to that described above of the device shown in FIG. 2. The shifting of information in this shift register may be carried out, for example, by means of a shift pulse having a duration of 400 nanosec., during which pulse the potential of the metal layer 58 is temporarily reduced to —5 volt. This pulse duration is small with respect to the life-time of holes in the silicon body 80 which is approximately 3 microsec. This is possible due to the drain of holes from the accumulation region of the unijunction transistor 51 occurring simultaneously with the injection of holes via the contact 65, as a result of which 51 is rapidly extinguished.

The surface area of the hook collector 67 in the device is larger than that of the emitter contact 65. As a result of this the return of holes from the modulation region situated between the contacts 65 and 59 and in the accumulation region of the unijunction transistor 51 is strongly prevented since, as a result of the smaller current density, the hook collector 67 collects better and emits worse than the emitter contact 65. Due to the construction of the contact 67 (A, B) as a hook collector, hole multiplication also occurs during the shift pulse as a result of which the injection at contact 65 is intensified.

Furthermore, in this device an n-type region 83 is diffused in each of the coupled unijunction transistors 51, 52, and 53 (see FIGS. 3 and 4) in the p-type emitter region (64, 66) which, via a contact window in the oxide layer, adjoins a metal layer 84 which is connected to the layer 58. As a result of this, injection of the emitter contact (for example, 64) via the semiconductor region 80 to the metal layer 58 and hence the danger of spontaneous firing of 51 is prevented during the shift pulse since the current path via the pn-diode (83, 64) and the metal layer 84 to the metal layer 58 has a smaller resistance than the current path via the semiconductor body 80.

The contact geometry in this device is chosen to be so that the emitting contact 65 is substantially entirely surrounded by the contacts 59 and 74. As a result of this the modulation region is kept as small as possible, so that an efficient coupling is obtained.

It will be obvious that the invention is not restricted to the examples described, but that many variations are possible to those skilled in the art without departing from the scope of this invention. For example, bistable elements others than those mentioned in the examples may be used, provided they show an accumulation region of minority charge carriers in the fired condition. Furthermore, the said conductivity type may be interchanged while semiconductors other than silicon may also be used. Furthermore instead of the said pn-contacts, metal semiconductor contacts may be used, while the coupling according to the invention may also be applied, in circuits other than shift registers, for example, memory circuits, ring counters, and so on. Also without departing from the scope of this invention, the geometry of the various contacts may be varied within wide limits.

What is claimed is:

1. A semiconductor circuit arrangement comprising:

(a) at least first and second identical bistable semiconductor circuit elements comprising a semiconductor body, first, and second end contacts on said body, each of said bistable elements comprising between said end contacts at least a first control electrode for switching said element to one of two stable conditions, an "on" condition in which at least a portion of said semiconductor body between said first and second end contacts is highly conducting and an "off" condition in which said portion is less conducting, said first end contacts of each of said bistable elements being electrically connected to a first supply conductor and each of said second end contacts being electrically connected to a second supply conductor, (b) Coupling means for electrically coupling said first and second bistable elements comprising a voltage divider comprising a semiconductor resistor having a semiconductor body of one conductivity type provided with third and fourth end contacts and fifth and sixth contacts situated between said third and fourth end contacts, said fourth end contact being electrically connected to said second supply conductor, said third end contact being electrically connected to a further supply conductor, said fifth contact being electrically connected to said first control electrode of said first bistable element, said sixth contact being electrically connected to a second control electrode of said second bistable element, said fifth contact being capable of injecting minority carriers into the body of said resistor, (c) means for applying DC voltages between said second supply conductor and each of said first and further supply conductors for establishing a conduction current through said bistable elements when said first bistable elements is in the "on" condition and said second bistable element is in the "off" condition, and for establishing a current through said resistor thus causing said sixth contact to assume a first potential insufficient for turning said second bistable element into the "on" condition, the potential of said further supply conductor being sufficient, if applied to said sixth contact, to turn said second bistable element into the "on" condition, and (d) means for temporarily changing the potential of said further supply conductor from an initial value to cause said fifth contact to be strongly biased in the forward direction thereby to cause a switching current to flow between said first control electrode of said first bistable element and said third end contact through said fifth contact, said switching current turning said first bistable element into the "off" condition and injecting minority carriers through said fifth contact into the resistor portion between said sixth contact and said third end contact thereby considerably reducing the resistance of said resistor portion so that upon restoring the potential of said further supply conductor to said initial value said sixth contact substantially assumes the potential of said further supply conductor thereby turning said second bistable element into the "on" condition through said second control eelctrode.

2. A semiconductor circuit arrangement as claimed in claim 1 in which said bistable elements and said resistor have one common semiconductor body.

3. A semiconductor circuit arrangement as claimed in claim 1 in which the connection between said first control electrode and said fifth contact comprises a diode which passes a switching current for turning said first bistable element into the "off" condition and in which the connection between said sixth contact and said second control electrode comprises a second diode which passes a switching current for turning said second bistable element into the "on" condition.

4. A semiconductor circuit arrangement as claimed in claim 1, wherein said bistable elements are first and second identical thyristors having a semiconductor body and each comprising four consecutive regions of alternate conductivity type, two end regions and two base regions forming a pnpn-structure, and each comprising said first and second end contacts on said end regions and between said end contacts at least said first control electrode on one of said base regions of each of said thyristors for switching said thyristor to one of two stable conditions, an "on" condition in which said thyristor is highly conducting and an "off" condition in which said thyristor is less conducting, said second control electrode of said second thyristor being on said base region on which said first control electrode is located, each of said first end contacts being electrically connected to the first supply conductor by means of first and second load resistances respectively and said second end contacts of each thyristors being electrically connected to the second supply conductor.

References Cited

UNITED STATES PATENTS 3,621,345 11/1971 Kasperkovitz ...... 317—235 C

JOHN W. HUCKERT, Primary Examiner
W. D. LARKINS, Assistant Examiner

U.S. Cl. X.R.

307—252 C, 301, 252 E; 317—235 C, 235 AB, 235 AE